United States Patent
Zhang et al.

(10) Patent No.: US 9,705,809 B2
(45) Date of Patent: Jul. 11, 2017

(54) METHOD AND DEVICE FOR ADJUSTING RATE OF DATA TRANSMISSION IN ETHERNET

(71) Applicant: ZTE Corporation, Shenzhen (CN)

(72) Inventors: Wei Zhang, Shenzhen (CN); Dandan Guo, Shenzhen (CN); Xiong Tang, Shenzhen (CN); Jinqing Yu, Shenzhen (CN); Hui Tu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 84 days.

(21) Appl. No.: 14/430,204

(22) PCT Filed: Sep. 18, 2013

(86) PCT No.: PCT/CN2013/083771
§ 371 (c)(1),
(2) Date: Mar. 20, 2015

(87) PCT Pub. No.: WO2014/044190
PCT Pub. Date: Mar. 27, 2014

(65) Prior Publication Data
US 2015/0229571 A1    Aug. 13, 2015

(30) Foreign Application Priority Data

Sep. 20, 2012 (CN) .......................... 2012 1 0351613

(51) Int. Cl.
*G06F 15/16* (2006.01)
*H04L 12/825* (2013.01)
(Continued)

(52) U.S. Cl.
CPC ............. *H04L 47/25* (2013.01); *H04L 1/0002* (2013.01); *H04L 25/14* (2013.01); *H04L 43/00* (2013.01); *H04L 43/10* (2013.01); *Y02B 60/31* (2013.01)

(58) Field of Classification Search
CPC ....... H04L 47/25; H04L 1/0002; H04L 43/00; H04L 25/14; H04L 43/10
(Continued)

(56) References Cited

U.S. PATENT DOCUMENTS

| | | | |
|---|---|---|---|
| 7,925,206 B2 * | 4/2011 | Jha | H04L 1/0001 455/11.1 |
| 2010/0267344 A1 * | 10/2010 | Guner | H04W 52/322 455/67.11 |
| 2013/0113278 A1 * | 5/2013 | Karl | B61L 15/0036 307/9.1 |

FOREIGN PATENT DOCUMENTS

| | | |
|---|---|---|
| CN | 101034967 A | 9/2007 |
| CN | 102238034 A | 11/2011 |
| TW | 200803299 A | 1/2008 |

OTHER PUBLICATIONS

International Search Report for corresponding application PCT/CN2013/083771 filed Sep. 18, 2013; Mail date Dec. 26, 2013.

* cited by examiner

*Primary Examiner* — Bryan Lee
*Assistant Examiner* — Oluwatosin Gidado
(74) *Attorney, Agent, or Firm* — Cantor Colburn LLP

(57) ABSTRACT

A method and device for adjusting rate of data transmission in Ethernet is provided. The method comprises: connection status of a data transmission link in the Ethernet is monitored; and a rate of data transmission in Ethernet is adjusted according to the monitored connection status. By way of monitoring the connection status of the data transmission (Continued)

link in Ethernet and then adjusting the rate of data transmission in Ethernet according to the monitored connection status, the problem in the related art that stability and reliability of data transmission are affected by a data transmission link failure in Ethernet is solved, thus greatly improving stability and reliability of data transmission, and improving user experience.

7 Claims, 6 Drawing Sheets

(51) Int. Cl.
      *H04L 1/00*           (2006.01)
      *H04L 12/26*         (2006.01)
      *H04L 25/14*         (2006.01)

(58) Field of Classification Search
      USPC .......................................... 709/224; 370/225
      See application file for complete search history.

METHOD AND DEVICE FOR ADJUSTING RATE OF DATA TRANSMISSION IN ETHERNET

TECHNICAL FIELD

The disclosure relates to the field of communication, including e.g., a method and device for adjusting the rate of data transmission in the Ethernet.

BACKGROUND

Ethernet, being a local area network applied most, comprises standard Ethernet (10 Mbps), fast Ethernet (100 Mbps), gigabit Ethernet (1000 Mbps), etc. and uses a Carrier Sense Multiple Access/Collision Detect (CSMA/CD) carrying collision detection access control method, which all comply with the IEEE802.3 standard.

With the continuous development of technologies, the user has an increasingly higher requirement on high rate and high bandwidth, and the 10 GBbps technology is born out from this, 10GBASE-T is an Ethernet standard using copper cable connection (6 types of shielded or unshielded twisted pairs), the effective bandwidth of the data layer is 10 Gbit/S, and the furthest transmission distance can reach 100 m. Because the data is transmitted at a high speed of 10 GBps, the stability and reliability of data transmission appear to be particularly important.

At present, in the transmitting process of Ethernet, when a corresponding failure, for example, a certain link of the twisted pair is damaged, occurs to the unshielded twisted pair, the whole Ethernet communication link breaks, and the data is unable to be transmitted. However, with the increasingly higher requirement of people on the stability and reliability of data transmission, especially in more important data transmission, if the interruption of data transmission caused by the sudden failure of the Ethernet communication link appears, this is unacceptable for the user.

At present, there is no effective solution for the problem in the related art that the stability and reliability of data transmission are affected by a data transmission link failure in the Ethernet.

SUMMARY

For the problem in the related art that the stability and reliability of data transmission are affected by a data transmission link failure in the Ethernet, a method and device for adjusting the rate of data transmission in Ethernet is provided in the embodiment of the disclosure, so at least to solve the problem.

According to an aspect of the disclosure, a method for adjusting rate of data transmission in Ethernet is provided, the method comprises: monitoring connection status of a data transmission link; adjusting a data transmission rate according to the monitored connection status; and performing data transmission according to an adjusted rate.

According to an embodiment of the disclosure, adjusting the rate of data transmission in Ethernet according to the monitored connection status comprises: negotiating on an adjustment of the rate according to the monitored connection status; and adjusting the rate of data transmission in Ethernet according to a negotiation result.

According to an embodiment of the disclosure, negotiating on the adjustment of the rate according to the monitored connection status comprises: based on that one or more links of the data transmission link are monitored to be in fault, determining through negotiation to reduce the rate of data transmission in Ethernet; and based on that the faulted one or more links are monitored to be recovered, determining through negotiation to improve the rate of data transmission in Ethernet.

According to an embodiment of the disclosure, adjusting the rate of data transmission in Ethernet according to the negotiation result comprises: based on that it is determined through negotiation to reduce the rate, inserting an IDLE code stream in an current code stream for data transmission, and reducing the rate to be (the current code stream for data transmission—the IDLE code stream)/the current code stream for data transmission*the current data transmission rate; and based on that it is determined through negotiation to reduce the rate, extracting the IDLE code stream from the current code stream for data transmission, and improving the rate to be a full rate.

According to an embodiment of the disclosure, after adjusting the rate of data transmission in Ethernet according to the monitored connection status, the method further comprising: conducting data transmission according to an adjusted rate.

According to an embodiment of the disclosure, wherein conducting data transmission according to the adjusted rate comprises: based on that the one or more links are monitored to be in fault, allocating data to be transmitted to remaining normal links, and conducting data transmission according to a reduced rate; and based on that the faulted one or more links are monitored to be recovered, allocating data to be transmitted to current normal links, and conducting data transmission according to a improved rate.

According to an embodiment of the disclosure, the connection status of the data transmission link is monitored by one of the following manners: a signal echo manner, a near-end crosstalk manner and a far-end crosstalk manner.

According to another aspect of the disclosure, a device for adjusting rate of data transmission in Ethernet is provided, the device comprises: a monitoring component, configured to monitor connection status of a data transmission link in Ethernet; an adjusting component, configured to adjust a rate of data transmission according to the connection status monitored by the monitoring component; and a transmitting component, configured to perform data transmission according to a adjusted rate adjusted by the adjusting component.

According to an embodiment of the disclosure, the adjusting component comprises: a negotiating element, configure to negotiate on an adjustment of the rate according to the monitored connection status; and an adjusting element, configured to adjust the rate of data transmission in Ethernet according to a negotiation result of the negotiating element.

According to an embodiment of the disclosure, the above-mentioned negotiating element comprises: a first negotiating sub-element, configured to, based on that one or more links of the data transmission link are monitored to be in fault, determine through negotiation to reduce the rate of data transmission in Ethernet; and a second negotiating sub-element, configured to, based on that the faulted one or more links in are monitored to be recovered, determine through negotiation to reduce the rate of data transmission in Ethernet.

According to an embodiment of the disclosure, the adjusting element comprises: a first adjusting sub-element, configured to, based on that it is determined through negotiation to reduce the rate, insert an IDLE code stream in an current code stream for data transmission and reduce the rate to be (the current code stream for data transmission—the IDLE code stream)/the current code stream for data transmission*the current data transmission rate; and a second adjusting sub-element, configured to, based on that it is determined through negotiation to improve the rate, extract the IDLE code stream from the current code stream for data transmission, and improve the rate to be a full rate.

According to an embodiment of the disclosure, the device further comprises: a transmitting component, configured to conduct data transmission according to an adjusted rate adjusted by the adjusting component.

According to an embodiment of the disclosure, the transmitting component comprises: a first transmitting element, configured to, based on that the one or more links are monitored to be in fault, allocate data to be transmitted to remaining normal links and conduct data transmission according to a reduced rate; and a second transmitting element, configured to, based on that the faulted one or more links are monitored to be recovered, allocate data to be transmitted to current normal links and conduct data transmission according to a improved rate.

By way of monitoring the connection status of the data transmission link and then adjusting the rate of data transmission according to the monitored connection status, the problem in the related art that stability and reliability of data transmission are affected by a data transmission link failure in Ethernet is solved, thus greatly improving stability and reliability of data transmission, and improving user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

A method and device for adjusting rate of data transmission in Ethernet are provided in the embodiment of the disclosure. The data transmission link is continuously detected to determine the connection status of a link. When a signal line of a certain link is in fault, the stability and reliability of data transmission are guaranteed by reducing the data transmission rate, and after the link is recovered to be normal, the transmission is conducted again at a normal speed. The introduction is made below through specific embodiments.

Figure 1:
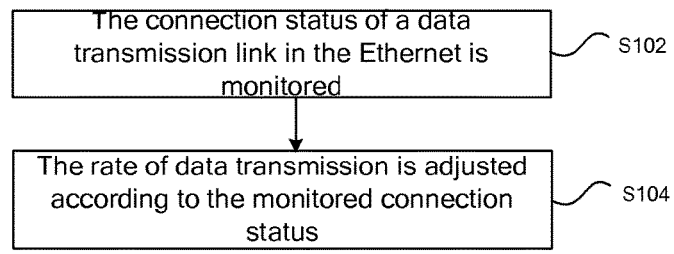
FIG. 1 is a flowchart of a method for adjusting the rate of data transmission in the Ethernet according to the embodiment of the disclosure.

A method for adjusting rate of data transmission in Ethernet is provided in the embodiment of the disclosure, the flowchart of the method for adjusting rate of data transmission in Ethernet is as shown in FIG. 1, and the method comprises the following steps (steps S102-S104):

S102: The connection status of a data transmission link in Ethernet is monitored;

S104: The rate of data transmission in Ethernet is adjusted according to the monitored connection status.

By way of monitoring the connection status of the data transmission link and then adjusting the rate of data transmission according to the monitored connection status, the problem in the related art that data transmission stability and reliability are affected by a data transmission link failure in the Ethernet is solved, thus greatly improving data transmission stability and reliability, and improving user experience.

The connection status of the data transmission link is monitored by one of the following manners: a signal echo manner, a near-end crosstalk manner and a far-end crosstalk manner. As long as the connection status of the link can be monitored, specifically using which manner can be determined according to an actual situation. Of course, the monitoring step can be executed periodically or aperiodically, and it is determined according to an actual situation.

After the connection status of the data transmission link is monitored, a local end and an opposite end for data transmission conduct interaction on the condition of the Ethernet link, i.e. the local end and the opposite end conduct corresponding information negotiation according to the connection status of the link. A Medium Access Control (MAC) layer of the local end sends information to a PHY layer (physical layer) and then transmits the information to a PHY layer of the opposite end through a twisted pair, and the PHY layer of the opposite end exchanges with an MAC layer of the opposite end.

For example, the signal echo manner is used for monitoring the links, when the two links of the unshielded twisted pair have no echo, it is indicated that this twisted pair link is broken. The local end sends a detection result to the opposite end through other three pairs of normal unshielded twisted pair transmission links, after the opposite end receives a link detection result of the local end, a signal of which the speed is reduced to ¾ rate level is passed back to the local end by the MAC layer, after the local end receives a related result, the local end correspondingly adjusts the transmission rate in Ethernet of the local end according to the received link detection result.

Based on the adjustment process, a preferred implementation is provided in the embodiment of the disclosure, i.e., the rate of data transmission in Ethernet is adjusted according to the monitored connection status, and the process comprises: the adjustment of the rate is negotiated according to the monitored connection status; and the rate of data transmission in Ethernet is adjusted according to a negotiation result. Conducting negotiation on the adjustment of the rate according to the monitored connection status comprises: in the case where one or more links of the data transmission link are monitored to be in fault, it is determined through negotiation to reduce the rate of data transmission in Ethernet; and in the case where the faulted one or more links are monitored to be recovered, it is determined through negotiation to improve the rate of data transmission in Ethernet. By means of the method, the method for adjusting the rate can be determined more reasonably, effectively and specifically.

When the data transmission rate is adjusted, it may be implemented in multiple ways, as long as the rate can be correspondingly adjusted. A preferred implementation is provided in the embodiment of the disclosure, i.e., the rate is reduced by the method of inserting an IDLE (idle) code stream in a code stream for data transmission, specifically, adjusting the rate of data transmission in Ethernet according to the negotiation result comprises: in the case where it is determined through negotiation to reduce the rate, an IDLE code stream is inserted in an current code stream for data transmission, and the rate is reduced to be (the code stream for data transmission—the IDLE code stream)/the code stream for data transmission*the current data transmission rate; and in the case where it is determined through negotiation to improve the rate, the IDLE code stream is extracted from the current code stream for data transmission, and the rate is improved to be a full rate.

Assuming that the code stream for data transmission is M, the inserted IDLE code stream is N, then the reduced rate is (M−N)/M*the rate before being adjusted. When the rate is a full rate, then N=0; when the rate is adjusted to be ¾ of the original rate, then N=¼ M; when the rate is adjusted to be ½ of the original rate, then N=½ M; and when the rate is adjusted to be ¼ of the original rate, then N=¾ M.

After the data transmission rate is adjusted, the data transmission is conducted according to a adjusted rate, in the case where one or more links are monitored to be in fault, data to be transmitted is allocated to the remaining normal links, and data transmission is conducted according to a reduced rate; and in the case where the faulted one or more links are monitored to be recovered, data to be transmitted is allocated to the current normal links, and data transmission is conducted according to a improved rate.

The data transmission method introduced in this embodiment is mainly applied in the Ethernet transmission process, in particular in 10G-BASE and 10GBASE-T high-speed data transmission environments, which is of course applicable to 10/100/1000 Ethernet.

Figure 2:
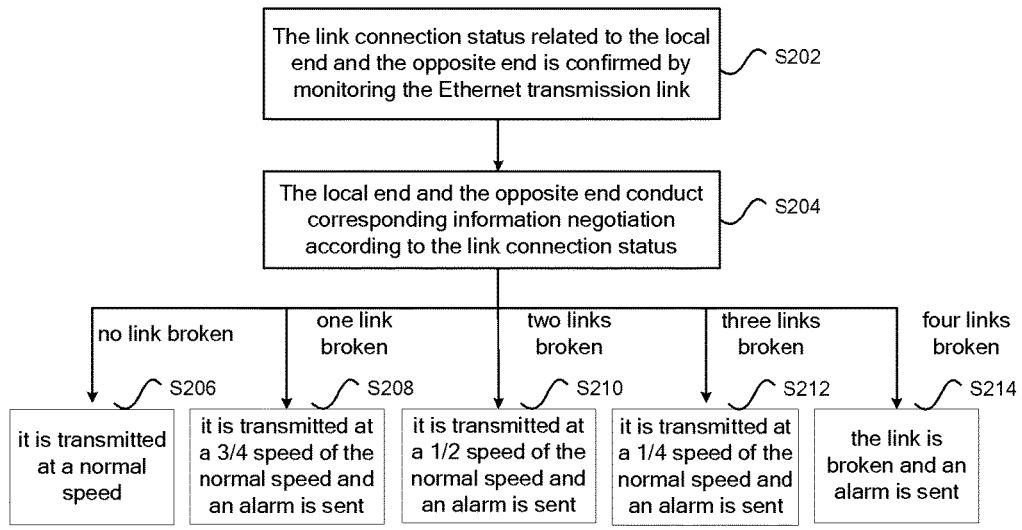
FIG. 2 is a flowchart of data transmission in the Ethernet according to the embodiment of the disclosure.

FIG. 2 is a flowchart showing Ethernet data transmission according to the embodiment of the disclosure, as shown in FIG. 2, the flow comprises the following steps (steps S202-S214):

Step S202, the link connection status related to the local end and the opposite end is confirmed by monitoring the Ethernet transmission link.

Figure 3:
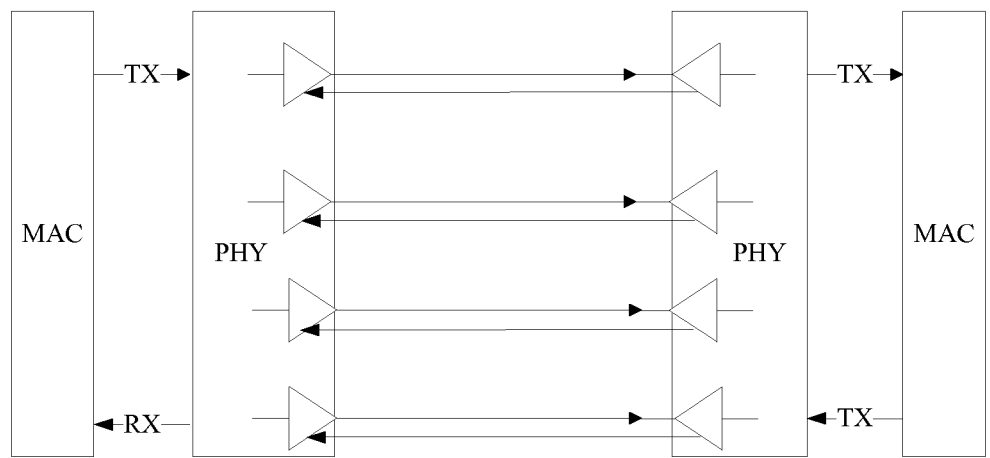
FIG. 3 is a schematic diagram showing the connection of an Ethernet data transmission link according to the embodiment of the disclosure.

The local end and the opposite end of the Ethernet 10GBASE-T are generally connected using 4 pairs of unshielded twisted pairs. A schematic diagram showing the connection of an Ethernet data transmission link is shown in FIG. 3, and any one or more pairs in the 4 pairs of unshielded twisted pairs may be damaged. The detection method is not limited, for example, a signal echo manner may be used, i.e., when a signal which is sent has no echo, it is indicated that this link breaks.

Step S204, the local end and the opposite end conduct corresponding information negotiation according to the link connection status. When the connection status of the link is that there is no link broken, it is switched to perform step S206; when there is one link broken, it is switched to perform step S208; when there are two links broken, it is switched to perform step S210; when there are three links broken, it is switched to perform step S212, and when there are four links broken, it is switched to perform step S214.

For example, the data transmission link in FIG. 3 is used, the MAC of the local end sends information to a PHY layer and then transmits the information to a PHY layer of the opposite end through a twisted pair, and the PHY layer of the opposite end exchanges information with an MAC layer of the opposite end.

When the link is detected to be abnormal, then the remaining unshielded twisted pairs which are normally connected are used for data exchange, and the link information is sent to the opposite end through the local end. Then the opposite end transmits the related information and information about requiring reducing speed and the corresponding speed reducing level to the local end.

Step S206, When there is no link broken, the data transmission is performed at a normal speed.

Step S208, When there is one link broken, the local end and the opposite end perform data transmission at a ¾ speed of the normal speed and send a failure alarm.

Step S210, When there are two links broken, the local end and the opposite end perform data transmission at a ½ speed of the normal speed and send a failure alarm.

Step S212, When there are three links broken, the local end and the opposite end perform data transmission at a ¼ speed of the normal speed and send a failure alarm.

Step S214, When there are four links broken, the local end and the opposite end stop data transmission and send a failure alarm.

Figure 4:
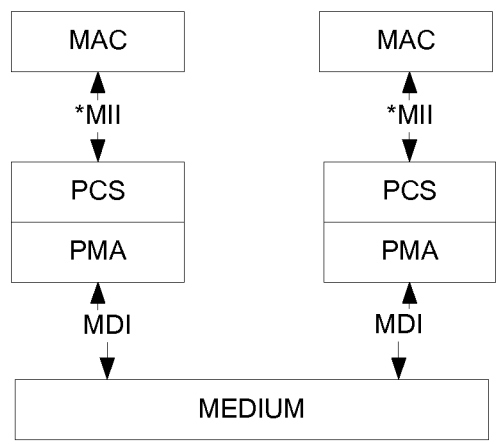
FIG. 4 is a structural schematic diagram of an Ethernet level according to an embodiment of the disclosure.

FIG. 4 is a structural schematic diagram of an Ethernet level according to an embodiment of the disclosure, as shown in FIG. 4, interface between the MAC layer and the PHY layer (including a PCS layer and a PMA layer) of the Ethernet is *GMI interface of which the rate is fixed. When the interface is XGMII, the rate is 10G, and when it is GMII, the rate is 1G. The interface rates of PMA and Medium are also fixed, in order to reduce the rate, the following methods can be used: a large FIFO is added on the PCS to buffer data, so that an interval for issuing data are controlled by the MAC, and an IDLE code is inserted in a PCS layer. Assuming that the code stream for data transmission is M, the inserted IDLE code stream is N, then the reduced rate is (M−N)/M*the rate before being adjusted. When the rate is a full rate, then N=0; when the rate is adjusted to be ¾ of the original rate, then N=¼ M; when the rate is adjusted to be ½ of the original rate, then N=½ M; and when the rate is adjusted to be ¼ of the original rate, then N=¾ M.

Figure 5:
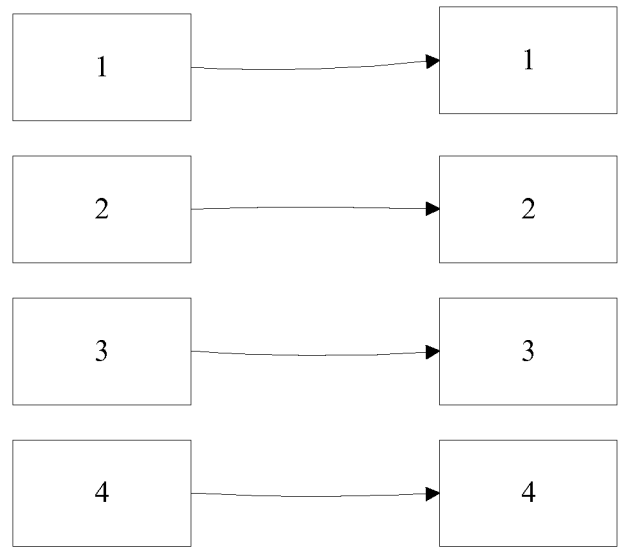
FIG. 5 is a schematic diagram showing the first mapping relationship of an Ethernet data package according to the embodiment of the disclosure.

Since the data rate of the GMI interface is fixed, in a general case, a data packet is divided into four equal parts, which of course can be performed using an equally distributing manner. When the four pairs of twisted pairs normally transmit, each pair normally transmits packets of the same size. FIG. 5 is a schematic diagram showing the first mapping relationship of an Ethernet data package according to the embodiment of the disclosure, as shown in FIG. 5, when all the links are normal, a manner of counter which is circulated by 1, 2, 3 and 4 is performed on the input data of the four equal parts. When the counter is 1, the transmission is performed on the first link of which the circuit is normal; when the counter is 2, the transmission is performed on the second link of which the circuit is normal; when the counter is 3, the transmission is performed on the third link of which the circuit is normal; and when the counter is 4, the transmission is performed on the fourth link of which the circuit is normal.

Figure 6:
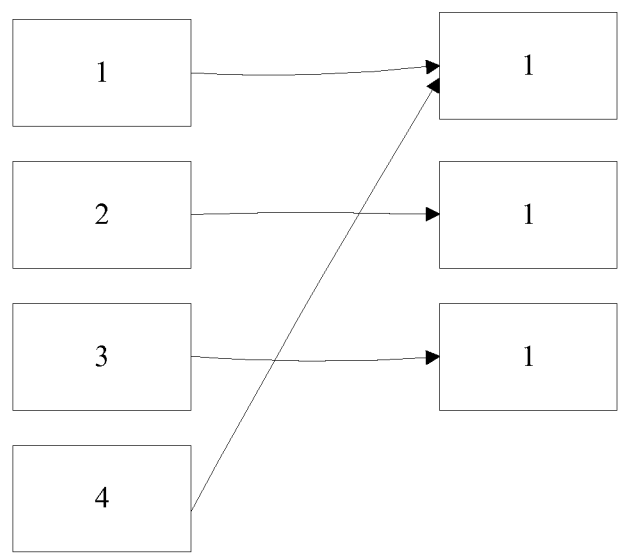
FIG. 6 is a schematic diagram showing the second mapping relationship of an Ethernet data package according to the embodiment of the disclosure.

FIG. 6 is a schematic diagram showing the second mapping relationship of an Ethernet data package according to the embodiment of the disclosure, as shown in FIG. 6, when one link is in fault, a manner of counter which is circulated by 1, 2, and 3 is performed on the input data of the four equal parts. When the counter is 1, the transmission is performed on the first link of which the circuit is normal; when the counter is 2, the transmission is performed on the second link of which the circuit is normal; and when the counter is 3, the transmission is performed on the third link of which the circuit is normal.

Figure 7:
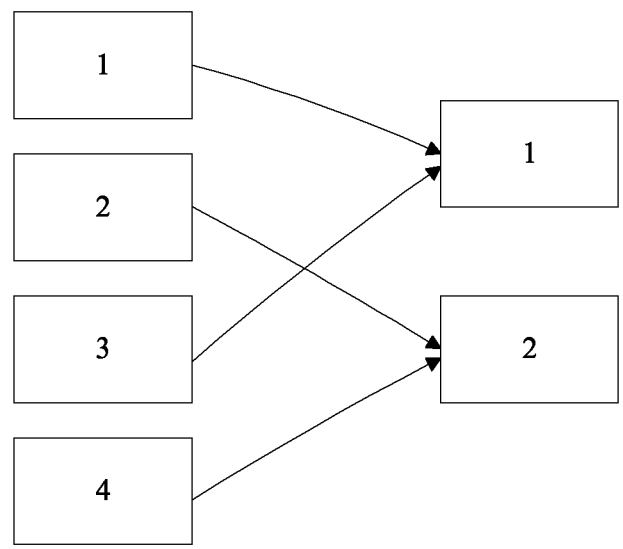
FIG. 7 is a schematic diagram showing the third mapping relationship of an Ethernet data package according to the embodiment of the disclosure.

FIG. 7 is a schematic diagram showing the third mapping relationship of an Ethernet data package according to the embodiment of the disclosure, as shown in FIG. 7, when two links are in fault, a manner of counter which is circulated by 1, 2, 3 and 4 is performed on the input data of the four equal parts. When the counter is 1 or 3, the transmission is performed on the first link of which the circuit is normal; and when the counter is 2 or 4, the transmission is performed on the second link of which the circuit is normal.

Figure 8:
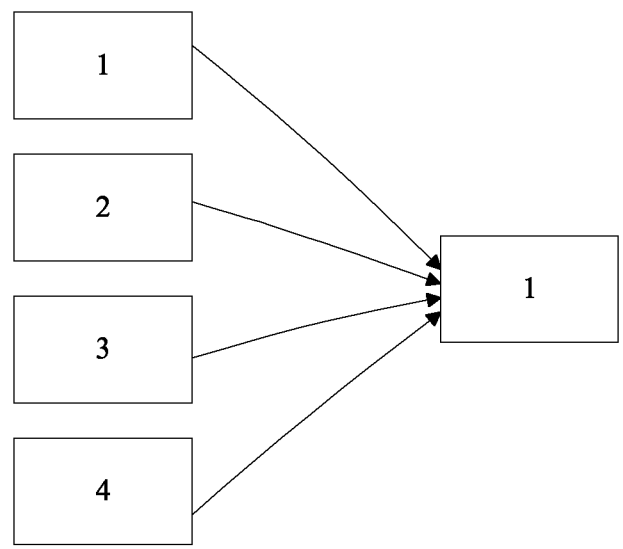
FIG. 8 is a schematic diagram showing the fourth mapping relationship of an Ethernet data package according to the embodiment of the disclosure.

FIG. 8 is a schematic diagram showing the fourth mapping relationship of an Ethernet data package according to the embodiment of the disclosure, as shown in FIG. 8, when three links are in fault, the input data of the four equal parts are all mapped on the only normal link for transmission.

The data transmission method is introduced below taking the 10GBASE-T Ethernet data transmission as an example, in the 10GBASE-T Ethernet data transmission, a VIP user accesses an important video stored in the server via Ethernet. The local end and the opposite end for data transmission detect the link at the same time, and the on-line echo, near-end crosstalk and far-end crosstalk offset detection method is used in the present embodiment. Assuming that two links of the unshielded twisted pair have no echo, it is indicated that this unshielded twisted pair breaks.

The local end sends a detection result to the opposite end through other three pairs of normal unshielded twisted pair transmission links, after the opposite end receives the link detection result of the local end, a signal of which the speed is reduced to be ¾ rate level is passed back to the local end through the MAC layer, and the local end receives a related result. The local end adjusts the Ethernet transmission rate according to the received link detection result. Half of the IDLE code is inserted by using a manner of inserting an IDEL code, the transmission rates of the local end and the opposite end are reduced to be ½ of the original speed, then the local end and the opposite end transmit at ½ speed of the original speed and further detects the link.

When two links are in fault, the local end and the opposite end transmit at ½ speed of the original speed, and a manner of counter which is circulated by 1 and 2 is performed on the input data of the four equal parts according to the mapping relation graph of the Ethernet packet. When the counter is 1, the transmission is performed on the first link of which the circuit is normal. When the counter is 2, the transmission is performed on the second link of which the circuit is normal. When the link is recovered, the transmission is performed again at a full rate manner, thus improving stability and reliability of data transmission and improving user experience.

Figure 9:
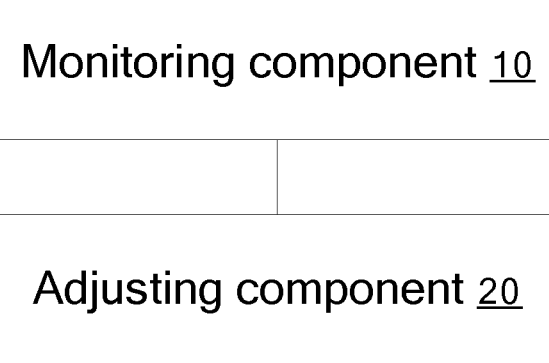
FIG. 9 is a structural block diagram of a device for adjusting the rate of data transmission in the Ethernet according to the embodiment of the disclosure.

Corresponding to the method for adjusting rate of data transmission in Ethernet, a device for adjusting rate of data transmission in Ethernet is provided in the embodiment of the disclosure. The device for adjusting rate of data transmission in Ethernet can be applied to Ethernet to realize the embodiments, FIG. 9 is a structural block diagram of a device for adjusting rate of data transmission in Ethernet according to the embodiment of the disclosure, as shown in FIG. 9, the device comprises a monitoring component 10 and an adjusting component 20. The structure is specifically introduced below.

The monitoring component 10 is configured to monitor the connection status of a data transmission link in Ethernet; and the adjusting component 20, connected to the monitoring component 10, is configured to adjust the rate of data transmission in Ethernet according to the connection status monitored by the monitoring component 10.

By means of the device, the monitoring component 10 monitors the connection status of the data transmission link, then the adjusting component 20 adjusts the rate of data transmission according to the monitored connection status, the problem in the related art that data transmission stability and reliability are affected by a data transmission link failure in Ethernet is solved, thus greatly improving data transmission stability and reliability, and improving user experience.

Figure 10:
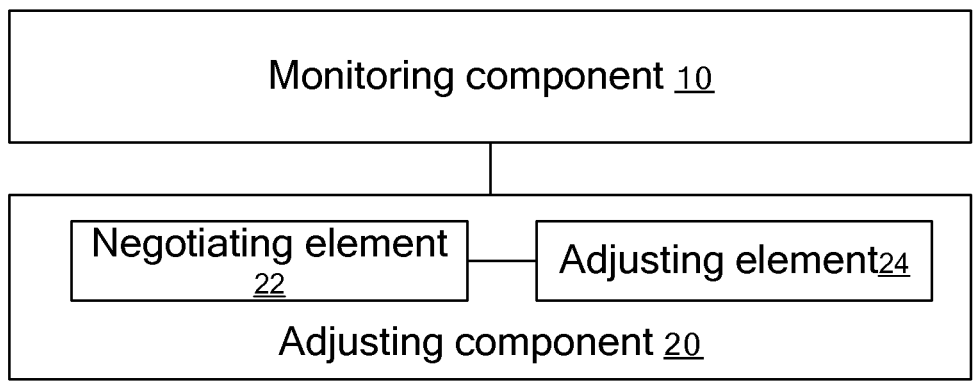
FIG. 10 is a specific structural block diagram of a device for adjusting the rate of data transmission in the Ethernet according to the embodiment of the disclosure.

FIG. 10 is a specific structural block diagram of a device for adjusting rate of data transmission in Ethernet according to the embodiment of the disclosure, as shown in FIG. 10, besides all components in FIG. 9, the adjusting component 20 further comprises: a negotiating element 22, which is configure to conduct negotiation on the adjustment of the rate according to the monitored connection status; and an adjusting element 24, connected to the negotiating element 22, which is configured to adjust the rate of Ethernet data transmission according to a negotiation result of the negotiating element.

The connection status of the data transmission link is monitored by one of the following manners: a signal echo manner, a near-end crosstalk manner and a far-end crosstalk manner. After the connection status of the data transmission link is detected, a local end and an opposite end of data transmission conduct interaction on the condition of the Ethernet link. A preferred implementation is provided in the embodiment of the disclosure, i.e., the negotiating element 22 comprises: a first negotiating sub-element, which is configured to, in the case where one or more links of the data transmission link are monitored to be in fault, determine through negotiation to reduce the rate of data transmission in Ethernet; and a second negotiating sub-element, which is configured to, in the case where the faulted one or more links are monitored to be recovered, determine through negotiation to improve the rate of data transmission in Ethernet.

After negotiation is conducted on the local end and the opposite end, the rate is adjusted according to the negotiation result, i.e., the adjusting element 24 comprises: a first adjusting sub-element, which is configured to, in the case where it is determined through negotiation to reduce the rate, insert an IDLE code stream in an current code stream for data transmission and reduce the rate to be (the current code stream for data transmission—the IDLE code stream)/the current code stream for data transmission*the current data transmission rate; and a second adjusting sub-element, which is configured to, in the case where it is determined through negotiation to improve the rate, extract the IDLE code stream from the current code stream for data transmission, and improve the rate to be a full rate.

After the data transmission rate is adjusted, the data transmission is performed according to the adjusted rate. A preferred implementation is provided in the present embodiment, i.e., the device further comprises: a transmitting component, which is configured to perform data transmission according to an adjusted rate adjusted by the adjusting component 20. The transmitting component comprises: a first transmitting element, which is configured to, in the case where one or more links are monitored to be in fault, allocate data to be transmitted to the remaining normal links and conduct data transmission according to a reduced rate; and a second transmitting element, which is configured to, in the case where the faulted one or more links are monitored to be recovered, allocate data to be transmitted to the current normal links and conduct data transmission according to a improved rate.

Figure 11:
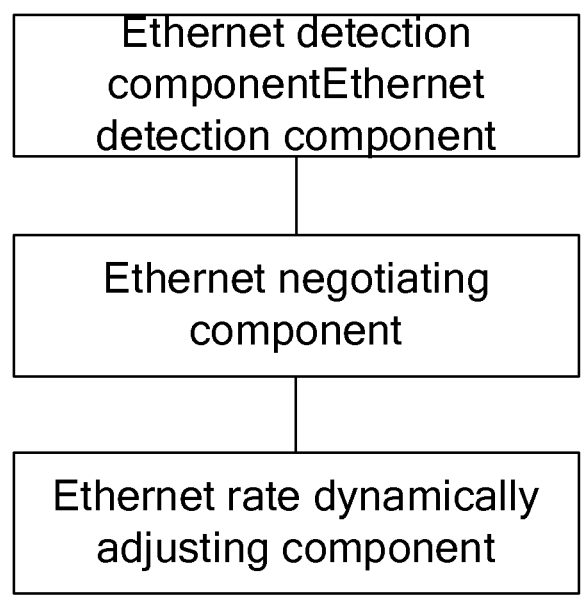
FIG. 11 is a structural schematic diagram of a device for protecting data transmission in the Ethernet according to the embodiment of the disclosure.

FIG. 11 is a structural schematic diagram of an Ethernet data transmission protection device according to the embodiment of the disclosure, as shown in FIG. 11, the device comprises an Ethernet detection component, an Ethernet negotiating component and an Ethernet rate dynamically adjusting component.

The Ethernet detection component, of which the function is equivalent to that of the monitoring component of the embodiment, is configured to detect the link in Ethernet transmission process to determine whether related links are connected.

The Ethernet negotiating component, of which the function is equivalent to that of the negotiating element of the embodiment, is configured to perform information interaction on the local end and the opposite end of the Ethernet, wherein the condition of the links of the MAC layer and the PHY layer are interacted.

The Ethernet rate dynamically adjusting component, of which the function is equivalent to that of the adjusting component of the embodiment, is configured to dynamically adjust the transmission rate of the Ethernet according to the connection condition of the related links of the Ethernet, so as to ensure the stability and reliability of data transmission.

From the description above, it can be seen that according to the disclosure, the link is continuously detected to determine the connection status of the link. When a signal line of a certain link in Ethernet is in fault, the local end and the opposite end perform interaction on the condition of the link of the Ethernet, and the reliable transmission of the data is guaranteed by using the method of reducing the data transmission speed. When the link of an Ethernet channel is recovered normal, the transmission is performed at a normal speed, thus greatly improving the stability and reliability of data transmission in the network, and improving user experience.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for adjusting rate of data transmission in Ethernet, comprising:
monitoring connection status of a data transmission link in Ethernet; and
adjusting a rate of data transmission in Ethernet according to the monitored connection status;
wherein adjusting the rate of data transmission in Ethernet according to the monitored connection status comprises: negotiating on an adjustment of the rate of data transmission in Ethernet according to the monitored connection status; and adjusting the rate of data transmission in Ethernet according to a negotiation result;
wherein negotiating on the adjustment of the rate of data transmission in Ethernet according to the monitored connection status comprises: determining through negotiation to reduce the rate of data transmission in Ethernet when one or more data transmission links are monitored and determined to be in fault; and determining through negotiation to improve the rate of data transmission in Ethernet when the one or more data transmission links in fault are monitored and recovered;
wherein adjusting the rate of data transmission in Ethernet according to the negotiation result comprises: inserting an IDLE code stream in an current code stream for data transmission when it is determined through negotiation to reduce the rate of data transmission, and reducing the rate to be (the current code stream for data transmission—the IDLE code stream)/the current code stream for data transmission*the current data transmission rate; and extracting the IDLE code stream from the current code stream for data transmission, and improving the rate to be a full rate when it is determined through negotiation to improve the rate.

2. The method according to claim 1, wherein after adjusting the rate of data transmission in Ethernet according to the monitored connection status, the method further comprises:
transmitting data according to an adjusted rate.

3. The method according to claim 2, wherein transmitting data according to the adjusted rate comprises:
allocating data to be transmitted through remaining normal links, when the one or more data transmission links are monitored and determined to be in fault, and transmitting data according to a reduced rate; and
allocating data to be transmitted to current normal links, and transmitting data according to an improved rate when the one or more data transmission links in fault are monitored and recovered.

4. The method according to claim 1, wherein the connection status of the data transmission link is monitored by one of the following manners:
a signal echo manner, a near-end crosstalk manner and a far-end crosstalk manner.

5. A device for adjusting rate of data transmission in Ethernet, comprising:
a non-transitory computer readable storage storing computer executable instructions; and a hardware processor coupled with the non-transitory computer readable storage to execute the computer executable instructions stored in the non-transitory computer readable storage, wherein the computer executable instructions comprise:
 a set of monitoring instructions to monitor a connection status of a data transmission link in Ethernet; and
 a set of adjustment instructions to adjust a rate of data transmission in Ethernet according to the connection status monitored by the set of monitoring instructions,
  wherein the set of adjustment instructions comprises: a set of negotiating instructions to negotiate an adjustment of the rate of data transmission according to the monitored connection status; and a set of adjustment instructions to adjust the rate of data transmission in Ethernet according to a negotiation result of the set of negotiating instructions; and wherein the set of negotiating instructions comprises: a first negotiating sub-element to determine through negotiation to reduce the rate of data transmission in Ethernet when the one or more data transmission links are monitored and determined to be in fault; and a second negotiating sub-element to determine through negotiation to improve the rate of data transmission in Ethernet when the one or more data transmission links in fault are monitored and recovered; and
  wherein the set of adjustment instructions comprises: a first adjusting sub-element to insert an IDLE code stream in an current code stream for data transmission, when determined through negotiation to reduce the rate; and reduce the rate to be (the current code stream for data transmission—the IDLE code stream)/the current code stream for data transmission*the current data transmission rate; and a second adjusting sub-element to extract the IDLE code stream from the current code stream for data transmission when determined through negotiation to improve the data transmission rate, and improve the data transmission rate to be a full rate.

6. The device according to claim 5, wherein the computer executable instructions further comprises:
 a set of transmitting instructions to transmit data in an adjusted rate adjusted by the set of adjustment instructions.

7. The device according to claim 6, wherein the set of transmitting instructions comprises:
 a first transmitting element to allocate data to be transmitted through remaining normal data transmission links and transmit data in a reduced rate, when the one or more data transmission links are monitored and determined to be in fault; and
 a second transmitting element to allocate data to be transmitted through current normal links and transmit data in an improved rate when the one or more data transmission links in fault are monitored and recovered.

* * * * *